United States Patent Office 3,530,708
Patented Sept. 29, 1970

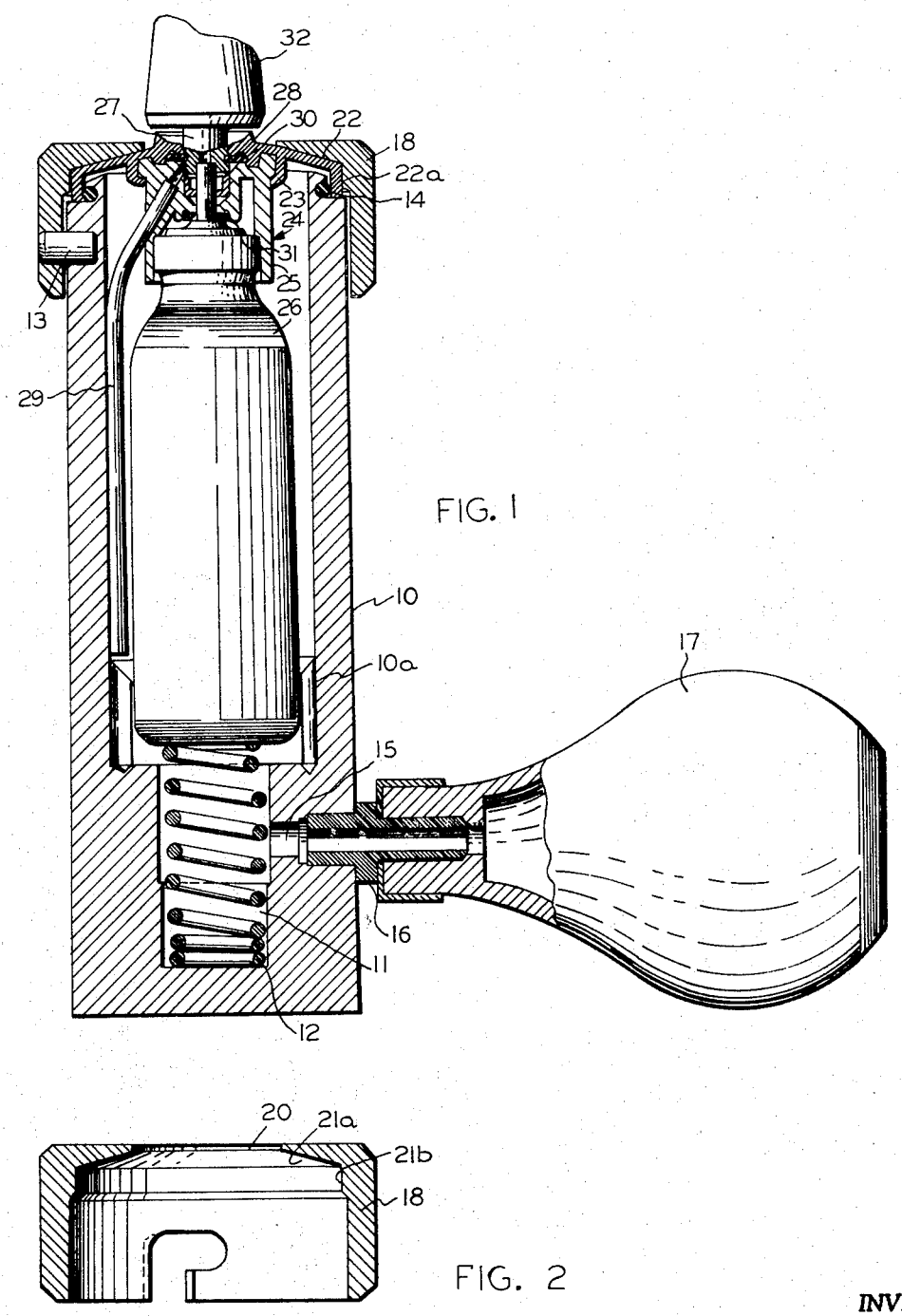

3,530,708
DEVICE FOR TESTING LIQUID TIGHTNESS OF A VALVE ASSEMBLY
Jean Y. Marand, St. Benoit, France, assignor to Geigy Chemical Corporation, Ardsley, N.Y.
Filed Nov. 25, 1968, Ser. No. 778,413
Int. Cl. G01m *3/06, 3/26*
U.S. Cl. 73—45.5                                       7 Claims

ABSTRACT OF THE DISCLOSURE

A device for testing liquid tightness of a valve assembly having a product container cover member with valve means and a propellant gas cartridge depending therefrom. The testing device is a chamber having only one end open, and having sealing means at the open end. A chamber lid is tightly engageable with the open end of said chamber. The inside surface of the chamber lid has a shape for holding the product container cover in fluid tight engagement with the sealing means. Means is connected to said chamber for feeding a fluid under pressure into said chamber, whereby if the valve assembly leaks escaping fluid can be detected.

---

This application relates to a device for testing for fluid tightness of a valve assembly for a double aerosol type dispenser.

There has recently been developed a so-called double aerosol type dispenser for fluent products such as gases, liquids, and powders. This type of double aerosol type dispenser generally comprises an outer product container for containing the product to be dispensed and a propellant cartridge positioned within the product container and suspended from the product container cover by a valve means which simultaneously opens the cartridge valve and a dip tube to the product in the product container. One example of such a dispenser is shown in U.S. Pat. No. 3,289,949 to Roth.

Several arrangements for simplifying the valve construction and the manner of attaching the cartridge thereto have been devised, and the method of assembling the overall dispensing device now includes the step of suspending the propellant cartridge and the valve means from the cover for the product container and attaching a dip tube thereto so that this assembly, hereinafter referred to as a valve assembly, can be mounted on a product container to complete the dispensing device.

However, in order to insure that the various gaskets in the assembly are functioning properly, before the product container is filled and the device completed, it is desirable to test the valve assembly for fluid tightness. It will be understood that if the gaskets are not sufficiently tight, there is a possibility that propellant gas will leak into the product container and build up undesirable pressure therein, and also the possibility that the contents of the product container will leak through the valve assembly.

It is an object of the present invention to provide a simple testing device for testing the fluid tightness of such a valve assembly.

This object is accomplished by providing a chamber adapted to have the valve assembly mounted in a fluid tight manner over the open top thereof, and having means to feed fluid, preferably a gas under pressure, into the chamber. After a valve assembly is positioned in a fluid tight manner over the open end of the chamber and gas under pressure is pumped in, the device is immersed in liquid, such as water, and, if bubbles of the gas under pressure are observed escaping from the top of the chamber, then the valve assembly is defective. Alternatively, a pressure sensing device can be attached to the chamber, and if the pressure of the gas is not maintained, the assembly is defective.

The invention will now be described in greater detail in connection with the accompanying drawing, in which:

FIG. 1 is a sectional elevational view of the device according to the invention, showing a valve assembly in place therein; and FIG. 2 is a sectional view of a lid member for the device shown in FIG. 1.

Referring to the figures, the testing device is comprised of a cylindrical chamber 10 which is closed at one end, the lower end in FIG. 1, and open at the other end. Within the cylindrical chamber 10, preferably near the bottom thereof, are guide projections 10a for guiding a propellant cartridge into position within the chamber in a manner which will be described in greater detail hereinafter.

In the bottom of the chamber 10 is a recess 11 within which is positioned a coil spring 12. The coil spring 12 is sufficiently long to project out of the recess 11 into the cylindrical chamber 10. On the outside of the chamber adjacent the open end thereof is a pin 13. In an annular recess around the open end is an O-ring gasket 14.

Opening through the wall of the chamber 10 near the lower end thereof is a fluid inlet 15, here shown as opening into the recess 11. It will be understood, however, that this inlet can open into the interior of the chamber 10 at any convenient location.

Positioned in the outer end of the fluid inlet 15 is a coupling member 16 to which is attached a pressure fluid supply means. In the present arrangement, this supply means is shown as a squeeze bulb 17.

A lid 18 is provided for the chamber 10, and has a downwardly depending portion which fits around the outside of the chamber 10 adjacent the top thereof, and has a right angle recess 19 in the lower edge thereof, which cooperates with the pin 13 to form a bayonet type connection. The lid further has an opening 20 in the top thereof, and the interior surface 21a of the lid immediately inside the opening 20 is conical in shape and joins a cylindrical portion 21b at the lower end thereof. The interior surfaces 21a and 21b of the lid 18 are designed to be complimentary in shape to a product container cover 22 for a product container forming part of an aerosol dispensing device. The cover 22 has a peripheral depending flange 22a which is in fluid tight engagement with the O-ring gasket 14 around the top of the chamber 10 when the cover 22 is held tightly on the chamber 10 by the lid 18 held tightly in place by the bayonet type connection.

The product container cover 22 has a depending flange 23, which engages around a valve housing 24 forming part of the valve means for the aerosol dispensing device. The valve housing has a cartridge engaging flange 25 depending therefrom which engages around the cover member of a propellant cartridge 26 so as to suspend the propellant cartridge 26 from the valve housing.

Slidable within the valve housing 24 is a valve stem 27 having a pushbutton 32 on the upper free end thereof. At its lower end the valve stem 27 engages the valve stem 28 of a cartridge valve which is contained within the neck of the cartridge 26. A product aspiration tube 29 extends downwardly from the valve housing 24, and within the valve housing 24 opens into a passage into a space beneath a two-way gasket 30. A further gasket 31 is provided in the bottom of the housing 24 and against which the cartridge 26 seats when it is engaged by the cartridge engaging flange 25.

When the valve assembly comprised of the cover, valve means and cartridge is mounted on a product container, when the parts are in the positions shown in FIG. 1, the valve assembly is inoperative and seals the interior of the product container and the interior of the cartridge 26 from the atmosphere. When the pushbutton is depressed, the stem 27 depresses the stem 28 to release propellant from the cartridge 26, and also depresses the gasket 30 to open the product aspiration tube to passages through the valve stem and to a venturi in the pushbutton through which the propellant passes so as to aspirate a product from the product container. At the same time, the movement of the gasket 30 opens up an air bleed passage into the product container to admit air to equalize the pressure in the product container.

It will be understood that the various gaskets and parts of the valve stem must be properly assembled, so that, when the assembly is in the position shown, the propellant does not leak into the product container, and the contents of the product container will not leak through the valve assembly.

In order to test the assembly for this fluid tightness, the valve assembly is placed in the chamber 10 with the cartridge 26 held in guides 10a and the product container cover 22 secured in position by the chamber lid 18 with the various parts in the positions as shown in FIG. 1. Thereafter, the pressure fluid supply means 17 is actuated to raise the fluid pressure within the chamber 10 to a pressure above atmospheric. The entire device can then be immersed in liquid, for instance, water. If the valve assembly is not fluid tight, bubbles will be observed escaping from the testing device in the vicinity of the valve assembly where it is exposed through the opening 20 in the cover 18. If, on the other hand, the valve assembly is liquid tight, no bubbles will be observed escaping. Alternatively, a pressure sensing device, such as a pressure gauge, can be attached to the chamber, and if the pressure is not maintained at a predetermined level, gas is leaking through the valve assembly and the assembly is defective. Automatic pressure sensing means can be used for assembly line production.

It will be appreciated that the shape of the chamber 10 can be modified to accommodate various other types and shapes of cartridges 26, and that the lid 18 can be shaped to accommodate other shapes of the product container covers 22. In fact, a common chamber 10 could have a series of such lids, one suitable for each of the various shapes of product container covers of the valve assembly to be tested.

It will be further appreciated that the pressure fluid supply means shown could be replaced by any other pressure fluid supply means, such as an air pump with appropriate valving means, a gas under pressure in a conventional storage tank, and the like.

It is thought that the invention and its advantages will be understood from the foregoing description, and it is apparent that various changes may be made in the form, construction and arrangement of the parts without departing from the spirit and scope of the invention or sacrificing its material advantages, the form hereinbefore described and illustrated in the drawing being merely a preferred embodiment thereof.

What is claimed is:

1. A device for testing liquid tightness of a valve assembly having a product container cover with valve means thereon and a propellant gas cartridge depending therefrom, said testing device comprising a chamber having only one end open, the open end of said chamber having a shape adapted to engage the container cover in the same manner as a product container would engage the container cover, sealing means associated with said open end of said chamber and adapted to engage the container cover in fluid tight engagement when the open end of the chamber covered and closed by the container cover, a chamber lid mechanically tightly engageable with the said chamber around said open end, the inside surface of said chamber lid having a shape which when the lid is on the chmber is spaced from the open end of the chamber and holds said product container cover in fluid tight engagement with said sealing means, and means connected to said chamber for feeding a fluid under pressure into said chamber, whereby when a product container cover and valve means with a depending propellant gas cartridge is placed on the open end of the chamber, and the chamber lid is placed over the container cover and tightly engaged with said chamber, the container cover is tightly held against the sealing means, thus sealing the space within the chamber so that when fluid under pressure is fed into the chamber, leaks in the valve means and its attachment to the container can be detected.

2. A device as claimed in claim 1 in which said chamber lid has an opening in the center thereof through which a portion of the valve assembly on the product container cover projects.

3. A device as claimed in claim 1 in which the inside surface of said lid has a contour complementary in shape to the product container cover for engaging the product container cover to hold it tightly against said sealing means..

4. A device as claimed in claim 1 in which said chamber has an annular recess around the open end thereof and said sealing means is an O-ring in said annular recess.

5. A device as claimed in claim 1 in which a bayonet type connection is provided between said chamber and said chamber lid.

6. A device as claimed in claim 1 in which said chamber has a recess in the inside of the closed end thereof and a spring in said recess projecting into the interior of said chamber and adapted to engage said cartridge.

7. A device as claimed in claim 6 in which said fluid pressure feeding means opens into said container through said recess.

References Cited

UNITED STATES PATENTS

| 1,649,287 | 11/1927 | Butler | 73—49.2 |
| 1,764,616 | 6/1930 | Fleming | 73—47 |
| 3,306,097 | 2/1967 | Wimmer | 73—49.2 |
| 3,431,773 | 3/1969 | Calhoun | 73—49.2 |

FOREIGN PATENTS

| 905,080 | 9/1962 | Great Britain. |

LOUIS R. PRINCE, Primary Examiner

W. A. HENRY II, Assistant Examiner

U.S. Cl. X.R.

73—46